United States Patent [19]
Reichner

[11] Patent Number: 5,120,436
[45] Date of Patent: Jun. 9, 1992

[54] LIQUID CLARIFICATION BY EFFECTING COHESION OF SOLIDS

[76] Inventor: Thomas W. Reichner, 1826 Warriors Rd., Pittsburgh, Pa. 15205

[21] Appl. No.: 672,953

[22] Filed: Mar. 21, 1991

[51] Int. Cl.⁵ .................. B01D 21/02; B01D 21/24
[52] U.S. Cl. .................. 210/207; 210/255; 210/519; 210/522; 210/534
[58] Field of Search ............... 210/201, 205, 206, 207, 210/255, 258, 519, 521, 522, 534, 535

[56] References Cited

U.S. PATENT DOCUMENTS

| | | | |
|---|---|---|---|
| 973,424 | 10/1910 | Greth | 210/207 |
| 1,175,126 | 3/1916 | Conklin | 210/535 |
| 1,420,250 | 6/1922 | Gavett | 210/522 |
| 1,770,353 | 7/1930 | Weber | 210/522 |
| 3,182,799 | 5/1965 | Krofta | 210/117 |
| 3,923,652 | 12/1975 | Condolios et al. | 210/208 |
| 3,933,642 | 1/1976 | Wilson | 210/206 |
| 3,965,013 | 6/1976 | Jackson | 210/534 |
| 4,055,494 | 10/1977 | Emmett, Jr. | 210/519 |
| 4,192,752 | 3/1980 | De Mello R. Pinto | 210/298 |
| 4,260,488 | 4/1981 | Condolios | 210/259 |
| 4,576,714 | 3/1986 | Pohoreski | 210/205 |
| 4,752,392 | 6/1988 | Dacquet | 210/519 |
| 4,871,459 | 10/1989 | Titoff | 210/519 |

FOREIGN PATENT DOCUMENTS 5340 of 1892 United Kingdom .
9814 of 1895 United Kingdom .

OTHER PUBLICATIONS

Mineral Processing Technology by B. A. Wills, First Edition of 1970, Published by Pergamon Press, Inc. Maxwell House, Fairview Park, Elmsford, N.Y., 10523, pp. 384 and 385.

Primary Examiner—Stanley S. Silverman
Assistant Examiner—Christopher Upton
Attorney, Agent, or Firm—Armstrong & Kubovcik

[57] ABSTRACT

Contaminated liquid or sludge clarification is accomplished by the use of a basic one or a series of operatively connected and vertically extending units or devices of the invention, each of which employs a hose that is spiraled around a cylindrical container wall whose upper end is open to an overflow weir from which recovery of lower specific gravity clarified liquid is effected and whose lower end is open and connected to a cone or funnel-shaped wall that defines a receiving and delivering chamber for separated-out heavier specific gravity contaminating liquid, sediment, viscous or thickened material. The hose of the basic unit is adapted at its upper end to receive the contaminated liquid, sludge or the like and any suitable chemical flocculant, precipitant, or coagulant, such as a polyelectrolyte, that may be injected or added to the contaminated liquid before it is introduced therein. The hose is adapted to thoroughly mix the heavier specific gravity material content with the coagulant as the liquid charge moves downwardly in a somewhat slowly swirling path therin. A nozzle is connected to the lower end and along the inside of a lower end portion of the cylindrical wall to deliver its contents in a substantially vertically laminated relation within the container above and adjacent to an upper end portion of the cone-shaped wall.

25 Claims, 3 Drawing Sheets

LIQUID CLARIFICATION BY EFFECTING COHESION OF SOLIDS

This invention relates to the separating out of solution materials having different specific gravities and particularly, to promoting the separating out of contaminating liquid or of the solid content of materials held in liquid suspension. More particularly, it pertains to an improved, more economical approach to the processing of slurries. It also has the advantage of flexibility as well as enabling an in-plant, progressive, multi-unit assembly to handle any quantity of plant waste in the form of a contaminated liquid. Also, it enables the provision of a uniform and best operating temperature environment that may be provided and maintained.

BACKGROUND OF THE INVENTION

Heretofore, it has, for the most part, been the practice in the liquid clarifying art to provide large diameter outdoor processing apparatus that make use of mechanically driven elements, such as rakes, or other driven elements, such as vibrated plates or rotating stirrers. One type of apparatus is called a "lamella" thickener and employs a pack of downwardly declining stacked metal or plastic trays, which may be vibrated for treating the sticky sludges, with bottom entry and top outflow, see pages 384 and 385 of the text "Mineral Processing Technology", by B. A. Wills, First Edition, 1979, published by Pergamon Press, Inc., Maxwell House, Fairview Park, Elmsford, N.Y. 10523. Equipment using rotating stirring is represented by the Emmett, Jr. U.S. Pat. No. 4,055,494 of 1977 and the Elie Condolios U.S. Pat. No. 4,260,488 of 1981. The former shows in FIG. 2, the use of an upwardly positioned impeller 49 and a series of downwardly spaced-apart mixing blades 69 mounted on a common drive shaft, while the latter patent shows a perforated, vertically spaced-apart group of paddle-like blades 7, and a lower pair of so-called conical blades 12 and 12, on a single motor driven vertical shaft 8 and finally, a horizontally extending material-compressing motor-driven screw 13.

The Pinto U.S. Pat. No. 4,192,752 of 1980 deals with a so-called clarifier for sugar juice which, as shown in FIG. 2, employs a group of downwardly-inwardly spaced, horizontally-extending, side-positioned trays 5, a rotary scraper 9, and a mud stirrer 17. A flocculation apparatus of Wilson U.S. Pat. No. 3,933,642 of 1976 appears to show an arrangement in which the liquid to be treated is introduced at the bottom end, see arrow 33, of a spiraled pipe coil unit made up of continuous pipe convolutions of upwardly increasing diameters and increasing lengths (see FIGS. 1 and 5). Its outlet 14 (see FIG. 3) is located at the upper end of the unit. It poses a highly complex and expensive manufacturing and replacement problem from the standpoint of the continuous length of the upwardly enlarged and lengthened pipe length portions, requires a powerful pumping action as to the sludge being treated, and presents a clogging and cleaning maintenance problem for clean-out. I have been unable to find any commercial installation involving this construction. The arrows of FIG. 3 appear to indicate that the liquid leaving the upper outlet end 14 of the pipe coil travels downwardly along an outer coil positioned and enclosed space and then moves upwardly along an inner chamber (see arrows 47 and 53 of the Figure). He relies on the use of so-called velocity gradients and centrifugal force in attempting to remove contaminating particles.

OBJECT OF THE INVENTION

It has been an object of my invention to solve problems before presented in this art.

Another object has been to devise an efficient and relatively inexpensively made and maintained liquid purification, sediment separating-out or thickening apparatus.

Another object has been to provide a separating device that will be relatively adaptable for meeting separating requirements and easy to maintain, and that will eliminate the need for the use in its separating zone of any motor-driven stirring, vibrating means or other moving mechanical parts.

A further object has been to devise a relatively simple device for the purpose stated, which is adaptable to in-plant installation and which may be used individually or in a mounted series arrangement to efficiently meet various load inputs and effect a desired solid-liquid separating-out or agglomeration of solid particles suspended in a liquid such as a slurry.

A still further object has been to devise a relatively simple, highly efficient and practical slurry and contaminated liquid treating apparatus that will substantially fully meet present day requirements for compactness, adaptability, reliability, simplicity and efficiency.

These and further objects will appear to those skilled in the art from the specification and the appended claims.

SUMMARY OF THE INVENTION

I have devised a solid-in-liquid separating out apparatus which ordinarily will make use of a chemical precipitate such as a polyelectrolyte, as well as an apparatus that may be employed to separate out liquids of different specific gravities, in both instances, to provide a reusable clarified liquid. I have devised a relatively simple basic separating unit which may be used alone or in combination with one or more like units, as in a vertical series assembly, to simultaneously effect an efficient separating-out action from the standpoint of various quantities of slurry or other higher specific gravity or "loaded" liquid, and fully and flexibly accommodate liquid suspensions, while minimizing plant floor space requirements and enabling a fully in-plant installation.

In each unit, I employ a vertically spiralled or helical coil that is preferably of cylindrical shape and into whose upper end contaminated liquid to be treated is introduced. The coil is shown as a length of a flexible hose of a uniform diameter wound around or about the outer reaches of a relatively rigid cylindrical, hollow chamber defining wall member, such as of metal or rigid plastic material. The coil may be made of an elastomer-like material as reinforced by a woven fabric to avoid the normal rigidity of a metal member and enable an easy maintenance-free, clog avoiding "give", and hand-squeezing. The inner surface of the coil should be relatively smooth to minimize friction from the standpoint of the charged liquid or slurry and its contaminant or solid particulate content.

The slurry or contaminated liquid is introduced as by pumping into the upper end of the coil. In the coil convolutions, no separating action is accomplished as it slowly moves downwardly as a thoroughly mixing flow. It is then delivered into an upper, open end mouth of a cone-like wall extension of the cylindrical wall member about which the coil is wrapped. The coil will preferably be shaped to provide entry into its upper end of the slurry tangentially the same as the rotation of a liquid down a drain, which is clockwise in the northern hemisphere and counterclockwise in the southern hemisphere. At its lower end, the flow enters a nozzle where separating action begins as it moves outwardly therefrom. The nozzle is shown as entering a lower chamber portion defined by its cylindrical wall to extend substantially tangentially along the inside thereof. The downward relatively slow down velocity of the charged liquid in the coil convolutions may be within an optimum range of about six to ten feet per second depending on the particle size, its distribution, the percentage of the solid content, the relative specific gravities of the constituent of the slurry, and the viscosity of the contaminated liquid being introduced or charged. A velocity in this range ensures a continuing flow of the slurry, while minimizing wear on the wall of the hose coil. The liquid to be clarified is introduced into the lower portion of the cylindrical wall from the nozzle at an optimum rotational velocity of about 3 to 15 RPM. The rate of feed may be controlled by varying the speed of a motor driven input feed pump.

The clarified liquid, lower specific gravity content of the charged material delivered from the coil, moves upwardly within the cylindrical chamber into an over flow weir from which it may be removed, while heavier specific gravity or solid material is removed from the bottom end of the cone-shaped chamber as shown controlled by a pinch valve.

In accordance with my invention, a liquid containing organic or inorganic contaminating material, such as fat-laden chicken processing water or a coal washing slurry containing dirt, slate, small coal particles, etc., is clarified by removing its contaminating higher specific gravity content. The thus clarified liquid may then be re-used in the plant and the relatively low volume contaminant content may be stored for proper disposal.

BRIEF DESCRIPTION OF THE DRAWINGS

In the drawings.

FIGS. 3 and 4 are of a slightly reduced scale with respect to FIGS. 1 and 2.

DETAILED DESCRIPTION OF THE INVENTIVE STRUCTURE

Figure 2:
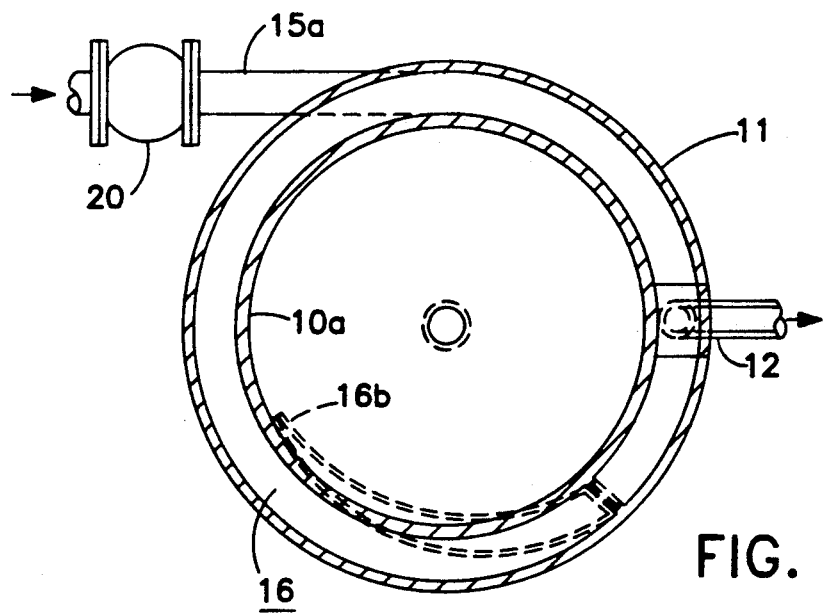
FIG. 2 is a top plan view on the scale of and of the same unit.
Figures 3, 4, 5:
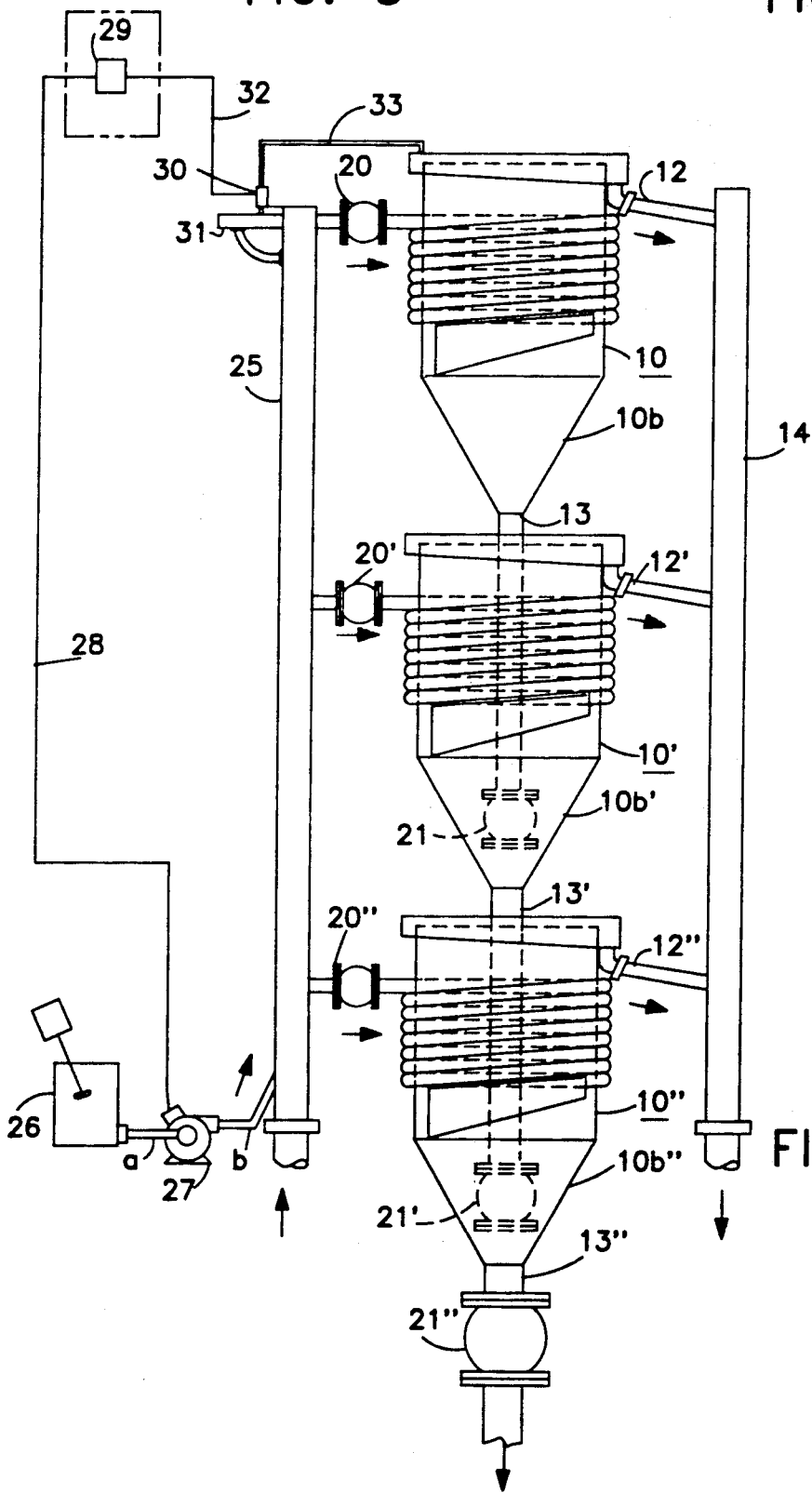
FIG. 3 is a horizontal section taken along a delivery nozzle shown connected to the lower end of a spirally wound processing coil illustrated in FIG. 1.
FIG. 4 is a side section in elevation on the scale of and of the nozzle of FIG. 3.
FIG. 5 is a reduced vertical view in elevation showing a typical operating layout employing my invention in which two or more units are employed in a vertically disposed and series connected relation and additionally provided with automatic operating and control means.

Referring to FIGS. 2, 3 and 4 of the drawings, I have shown a basic processing unit 10 constructed and utilized in accordance with my invention. It has an upper, cylindrical housing wall 10a which is open at its lower end portion into a lower cone or funnel-shaped housing 10b. The lower end portion of the cylindrical housing wall 10a serves as an intermediate connecting portion between a hose-wrapped upper cylindrical portion and an open mouth of the cone-shaped housing wall 10b. As shown, a hose 15 having a passageway of substantially uniform diameter along its length is wound spirally about the outside or periphery of the upper portion of the cylindrical housing 10a to provide a down-flow helix C within which a thorough and substantially uniform process mixing of a contaminated liquid or sludge charge and a suitable coagulant is effected. The contaminated liquid and the coagulant are shown introduced into the hose 15 from its upper end 15a through a pinch valve 20. A suitable type of pinch valve used in my apparatus, such as designated in my drawings as 20, 20', 20", 21, 21' and 21", is sold by Red Valve Co. of 600 North Bell Avenue, P.O. Box 548, Carnegie, PA, as its Series 4700.

The inside of the upper cylindrical housing wall 10a defines a final separation zone or chamber within which clarified lighter specific gravity liquid moves upwardly and into a collection weir 11 that extends about an upper lip of the wall 10c. The contaminating heavier specific gravity liquid or solid material flows downwardly and collects in the chamber of the lower cone-shaped wall 10b (see FIG. 1) from which it may be removed through a pinch valve 21 for storage and proper disposal. On the other hand, clarified liquid may be removed from a down-spout end 11a of the weir and delivered by pipe 12 for re-use.

Figure 1:
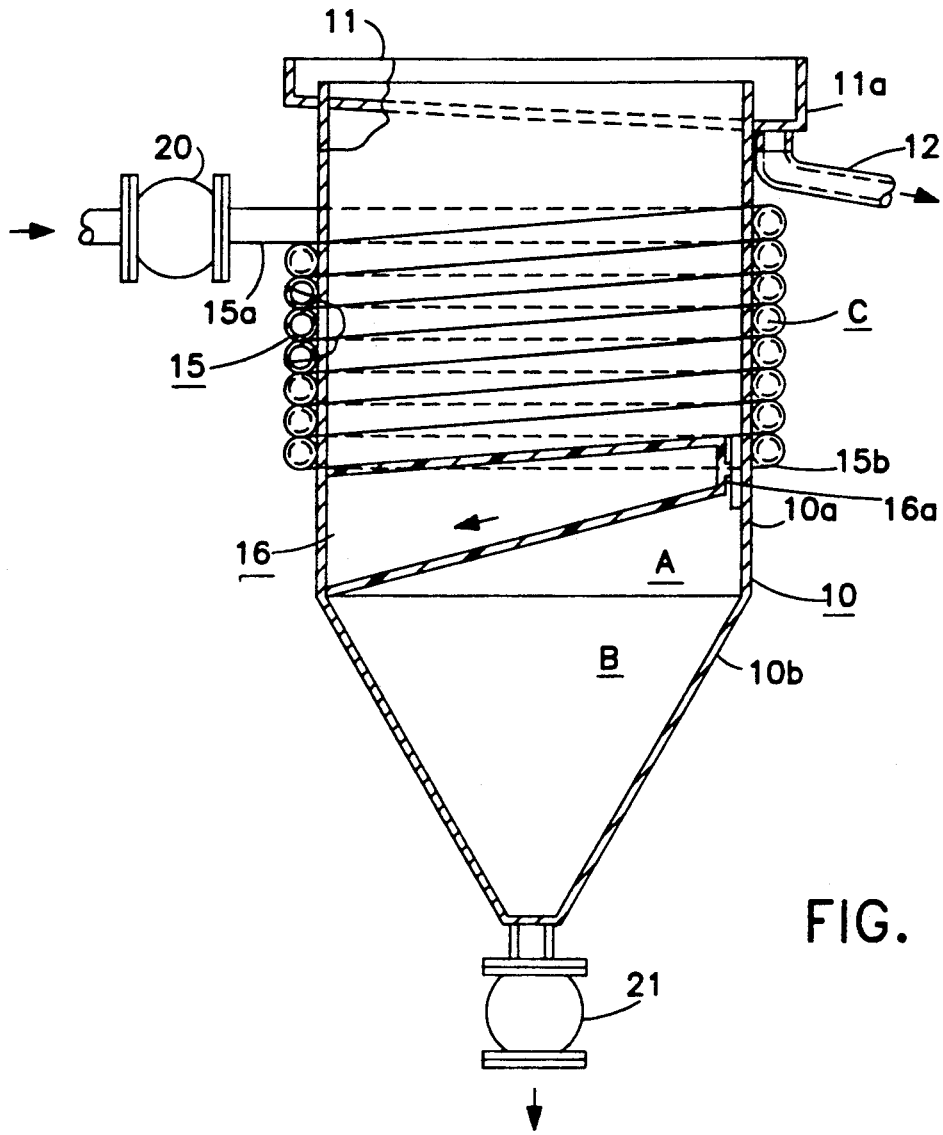
FIG. 1 is a vertical view in elevation of a basic or individual apparatus unit or device constructed in accordance with my invention.

As shown in FIG. 1, the contaminated liquid to be treated, as mixed with a suitable coagulant, enters upper end portion 15a of spirally coiled hose 15 through pinch valve 20. The hose of the coil 15, as previously indicated, is of flexible or resilient construction and may thus be closely wound in a uniform manner about the outside of the upper reaches of the circular wall 10a. It terminates above the intermediate wall portion of the housing 10 which, as previously indicated, represents the lowermost end portion of cylindrical wall 10a. Also, as shown, the hose of the coil 15 is of uniform passageway diameter throughout its helical length and is connected at its lower end 15b by a fitting assembly 17 to an inlet end portion 16a of a nozzle 16 (see also FIGS. 3 and 4). The nozzle 16 which may be of metal or solid plastic construction extends into and along the inside of the wall 10a in a conforming, somewhat tangential relation with respect thereto (see FIG. 2). FIGS. 3 and 4 show that opposite vertical sides of the nozzle 16 gradually converge transversely towards its open delivery end portion 16b and define a vertically widened, open, slit-like delivery end portion 16b from which coagulate and liquid issue in an initiated laminated relation into the intermediate portion of the main processing and separating chamber of the housing 10a.

In FIG. 5, I show a typical, vertically stacked series utilization of my inventive units or devices and, as provided with a representative automatic control system that may be used to enable a substantial uniformity of separating action where, for example, the quantity of the contaminant content in the charged material may vary from time to time. Each upper processing unit of the tier, such as 10 and 10' is provided with a "down" delivery pipe extension 13, 13' of a sufficient length to extend centrally downwardly along the inside of the next lower unit, such as 10' and 10", and into cone-shaped, contaminate collecting chamber portion 10b, and 10b" thereof through an associated pinch valve 21 and 21'. This is accomplished in such a manner as to progressively feed the contaminant material in series progression into the cone-shaped lower housing portion 21" of the lowermost unit 10".

The clarified liquid of each series unit 10, 10' and 10" is fed from its weir through downwardly sloped drain pipes 12, 12', and 12" into a common delivery pipe or header 14. The contaminated liquid to be clarified is fed (see arrow D of FIG. 5) through a common header or pipe member 25 and pinch valves 20, 20" and 20" into each of the units. At the same time, a coagulant or flocculant is shown as fed from a flocculant or coagulant holding and mixing tank 26 along lines a and b by an electric motor driven pump 27 into vertically extending, elongated, common input header 25 in such a manner that there is a preliminary mixing of the contaminated liquid and the coagulant or flocculant before they are introduced into the units 10, 10' and 10".

A suitable automatic control of system of FIG. 5 may be attained using typical equipment, such as marketed by Ramsey Technology, Inc. of 1853 W. County Road C, St. Paul, Minn. 55113. In FIG. 5, 26 represents a coagulant or flocculant holding tank which is shown provided with an electric, motor-driven agitator-mixer. A so-called Clarometer electrical control module 29 made by Ramsey is shown connected through a motor speed control electric line 28 to proportion the feed of motor driven pump unit 27 in accordance with a continuous sampling of the liquid being introduced into the input header 25, as taken by a Ramsey sampler module 30 and its sampler well return unit 31, and as connected electrically by line 32 to a control module 29 which may be set to provide a properly proportioned amount of coagulant to the contaminated liquid being introduced (see arrow D of FIG. 5). Line 33 takes a continuous sampling of the clarified liquid from the weir of unit 10 and the sampled liquid is then returned to the input header by the unit 31.

Figure 6:
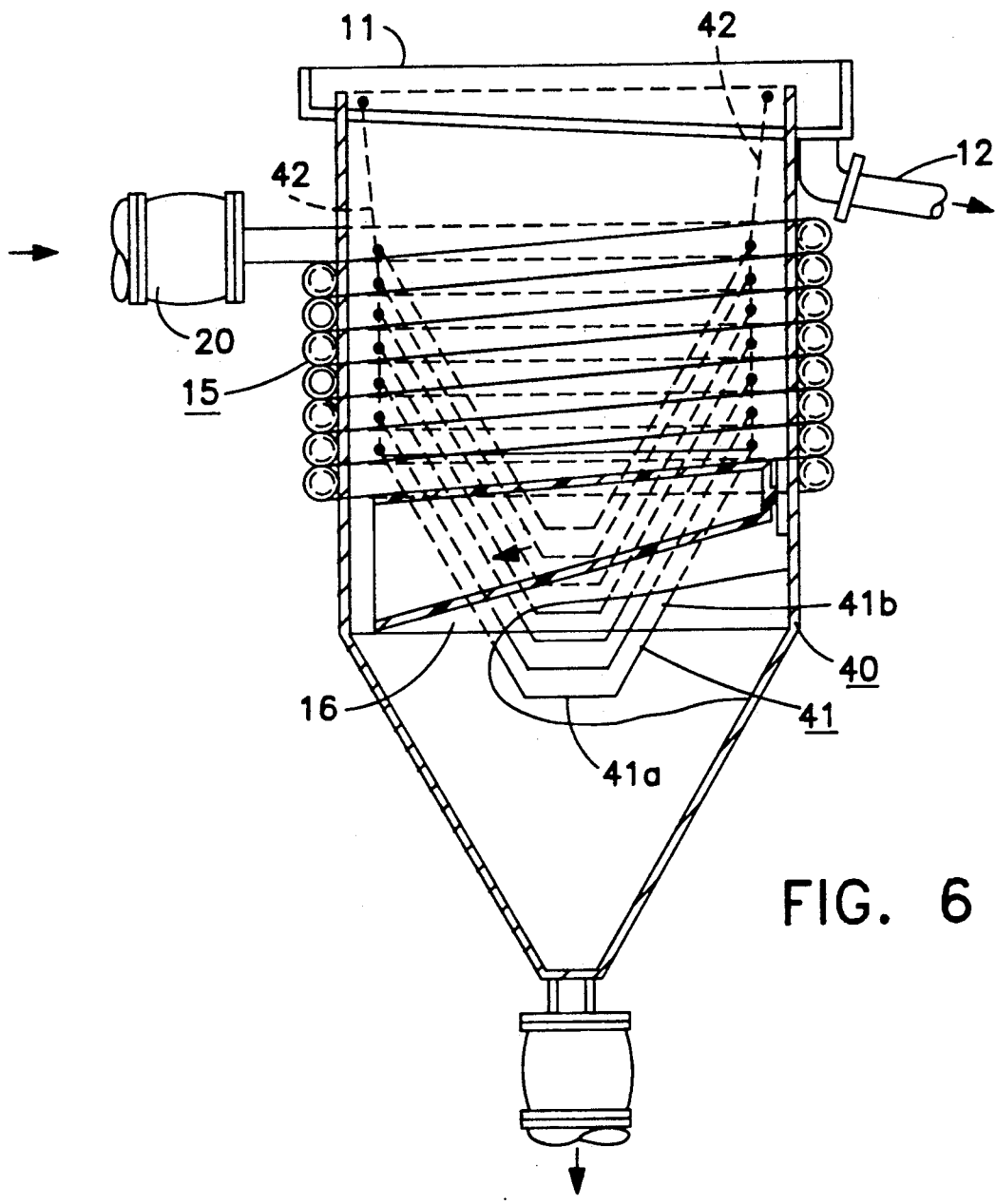
FIG. 6 is vertical view in elevation on the scale of FIGS. 1 and 2 showing a modified embodiment of my invention in which a series of internally stacked cones are mounted to extend centrally along an inside area of the upper and lower chambers of the housing to provide increased laminar flow for settling suspended solids that are particularly difficult to precipitate out.

FIG. 6 shows a modified embodiment of my apparatus in which a series of vertically spaced-apart laminar cone-like trays 41 are suspended in a nested somewhat closely spaced relation with respect to each other and in an inside spaced relation within the upper cylindrical wall of processing unit 40. Each tray 41 of conical shape has a downwardly, inwardly sloped sidewall 41b that converges in a relatively small width, open end portion 41a. A pair of suspension chains 42, as shown, are secured to the inside wall of the apparatus to serve as supporting hangers for the trays 41. This modified type of construction may be used when the separating-clarifying operation is to be accomplished on a highly maximized basis.

Figure 7:
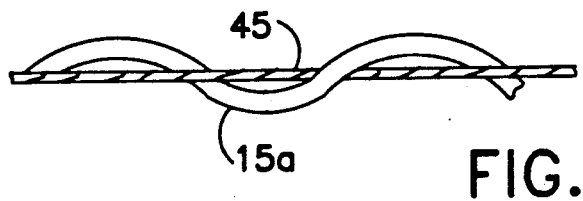
FIG. 7 is a reduced fragmental view showing a modified type of hose winding or coiling that employs a wire cable or the like that serves as a mandrel about which the hose is looped to provide it with an "in" and "out" looping in its spirally coiled relation about the upper cylindrical wall of a device of my invention to provide increased static mixing action.

In FIG. 7, I have shown a way to further enhance the mixing and coagulating action within the hose 15. In this type of arrangement, the hose 15a is wound or wrapped in a spiral about a flexible support, such as a wire, cord or cable 45, and the latter is then wrapped spirally about and along the outside of the cylindrical housing wall to form a helix.

What is claimed is:

1. An improved clarification apparatus for a liquid containing a contaminating material of a higher specific gravity than its liquid content that is to be clarified which comprises; a vertically extending housing having an upper wall portion defining a vertically disposed substantially cylindrical upper processing chamber, having a lower wall portion defining a downwardly disposed and converging contaminating material collecting chamber, and having an intermediate wall portion defining a substantially cylindrical connecting chamber open between said upper and lower chambers; a weir positioned at an upper end of said housing and open to said upper processing chamber for collecting clarified liquid rising from said intermediate chamber into said upper chamber, a hollow processing coil extending downwardly in a spiraled relation along said upper wall portion, means at an upper end portion of said coil for introducing the liquid to be clarified and a coagulant therein for downstream flow and mixing movement of the coagulant and the contaminating material in the liquid to form a thoroughly mixed liquid sludge within said coil, a nozzle connected to a lower end of said coil to receive the liquid sludge, and said nozzle being enlarged vertically depthwise towards an open delivery end portion to provide means to separate and deliver clarified liquid and the sludge content of the downstream flow from said coil in a laminar relation therefrom along the inside of said intermediate wall portion, whereby the clarified liquid will move in a curvalinear and upward path from said intermediate wall portion along the inside of said upper chamber portion into said weir, and the sludge will move downwardly from said intermediate chamber portion into said lower collecting chamber.

2. An apparatus as defined in claim 1 wherein said coil is of flexible hose construction.

3. An apparatus as defined in claim 2, wherein said coil is of a substantially uniform cross-sectional diameter along its extent.

4. An apparatus as defined in claim 2 wherein said coil is wound in a spiral-like relation about a length of a supporting cord, and said cord is in a wound-about helix-shaped relation extending along said upper chamber portion of said housing.

5. An apparatus as defined in claim 1, wherein said coil is of flexible material of substantially smooth inner wall construction and is coiled in a direction from its upper open end in accordance with the direction of liquid gravity flow of the hemisphere in which the apparatus is lasted.

6. An apparatus as defined in claim 1, wherein means is provided to introduce the liquid to be clarified into said cylindrical chamber in such a manner as to maintain its rotational velocity therein within a rate of about 3 to 15 RPM.

7. A apparatus units of the defined construction of claim 1, consisting of at least one upper unit and one lower unit in vertically disposed and aligned relation with respect to each other, the upper one of said units having a discharge pipe member connected to receive higher specific gravity material from its lower end chamber portion, said pipe member extending vertically downwardly from said upper unit along the inside of said lower unit to deliver material of heavier specific gravity collected by said upper unit into the lower end chamber portion of said lower unit to enable a combined discharge of the higher specific gravity material therefrom.

8. A series of apparatus units as defined in claim 7, wherein a pinch valve is connected to the discharge end portion of said pipe member to enable a controlled feed of the higher specific gravity material therefrom.

9. A series of apparatus units as defined in claim 8, wherein a common manifold is connected to the upper end of each said coil of each of said units for supplying contaminated liquid material thereto, means is connected to said manifold to supply contaminated liquid material to be processed thereto, and means is connected to said weir of one of said units for testing its clarified liquid and automatically supplying coagulating material to said manifold in accordance with processing requirements of said unit.

10. A series of apparatus units as defined in claim 9, wherein a pinch control valve is positioned in each connection between said coil of each of said units and said manifold, and a motor driven pump means is provided for supplying the coagulating material to said manifold at a rate to provide a residence time of the liquid being treated of about 6 to 15 minutes in each of said apparatus units.

11. An apparatus as defined in claim 1, for clarifying a liquid having an especially heavy burden of higher specific gravity material wherein a vertically shaped-apart series of cone-shaped lamella trays are suspended within said upper portion of said housing to direct clarified liquid upwardly into said weir and to separate out and collect and direct higher specific gravity contaminating material downwardly into said lower end chamber portion.

12. An improved apparatus as defined in claim 1 wherein said nozzle is mounted to extend in a horizontal curvalinear relation along said intermediate wall portion.

13. An improved apparatus as defined in claim 1 wherein said nozzle is elongated and extends substantially horizontally along the inside of said intermediate wall portion and the open delivery end portion is shaped to define a narrow vertically extending slot-like opening therein.

14. An improved apparatus as defined in claim 1 wherein said nozzle open delivery end portion diverges vertically and converges horizontally towards said delivery end portion to define a relatively narrow vertically extending slot-like opening from which laminar material is projected into said intermediate chamber.

15. An apparatus as defined in claim 1 wherein, said nozzle is of rounded shape at its back end to which a lower end of said coil is connected, and said nozzle is transversely narrowed at its discharge end to feed a higher and a lower specific gravity content of the liquid in a laminar relation into said intermediate chamber.

16. An improved apparatus as defined in claim 1 wherein a support cord is wound-about said upper wall portion of said housing to define a helix, and said hollow processing coil is spirally wound about and along said support cord.

17. An improved apparatus for clarifying a liquid containing contaminating solid or liquid material held in suspension therein wherein the liquid to be clarified is of lower specific gravity than the contaminating material which comprises, a housing defining a centrally-vertically disposed receiving and processing chamber for separating and moving clarified liquid of lower specific gravity upwardly and contaminating material of higher specific gravity downwardly therein, a weir at an upper end of said housing for collecting clarified liquid moving upwardly within said chamber, a hollow processing coil in a wrapped-around vertically extending relation along an upper chamber portion of said housing, means at an upper end portion of said coil for receiving the liquid to be clarified and a coagulant, said coil being constructed and arranged to substantially uniformly mix the coagulant with the contaminating material during their downward travel within said coil, means at a lower end of said coil to feed the coagulant mixed material and the liquid to be clarified in a laminated relation into an intermediate portion of said chamber, said means being a nozzle that is vertically elongated and of reduced channel width towards its front outlet end to define a relatively narrow slit through which the liquid is fed into said intermediate portion of said chamber, said housing having a lower end chamber portion for collecting contaminating material of higher specific gravity, means for removing clarified liquid from said weir, and means for removing coagulated material of higher specific gravity form said lower end chamber portion.

18. An apparatus as defined in claim 17 wherein said upper and intermediate portions of said housings are of cylindrical shape, and said feed means extends substantially tangentially into said intermediate portion of said chamber.

19. An apparatus as defined in claim 18 wherein said coil is of flexible hose construction, is of substantially uniform cross-sectional inner diameter along its extent, and is of substantially smooth inner wall construction.

20. A series of apparatus units of the defined construction of claim 18 consisting of at least one upper unit and one lower unit in a vertically disposed and aligned relation with respect to each other, the upper one of said units having a discharge pipe member connected to receive higher specific gravity material from its lower end chamber portion, said pipe member extending centrally vertically downwardly form said upper unit along the inside of said lower unit to directly deliver material of heavier specific gravity collected by said upper unit into the lower end chamber portion of said lower unit to enable a combined discharge of the higher specific gravity material therefrom.

21. A series of apparatus as defined in claim 20 wherein a pinch valve is connected to the discharge end portion of said pipe member to enable a controlled feed of the higher specific gravity material therefrom, a common manifold is connected to the upper end of each said coil of each of said units for supplying contaminated liquid material thereto, means is connected to each said manifold to supply contaminated liquid material to be processed thereto, and means is connected to said weir of one of said units for testing its clarified liquid an automatically supplying coagulating material to said manifold in accordance with processing requirements of said unit.

22. A series of apparatus as defined in claim 21 wherein a pinch control valve is positioned in each connection between said coil of each of said units and said manifold, and a motor driven pump means is provided for supplying the coagulating material to said manifold at a rate to provide a residence time of the liquid being treated of about 6 to 15 minutes in each of said apparatus units.

23. An apparatus as defined in claim 17 wherein, said coil is wound in a spiral-like relation about a length of a supporting cord, and said cord is in a wound-about helix-shaped relation extending along said upper chamber portion of said housing.

24. An apparatus as defined in claim 17 wherein means is provided to introduce the liquid to be clarified into said cylindrical chamber in such a manner as to maintain its rotational velocity therein within a rate of about 3 to 15 RPM.

25. An apparatus as defined in claim 17 for clarifying a liquid having an especially heavy burden of higher specific gravity material wherein a vertically shaped-apart series of cone-shaped lamella trays are suspended within said upper portion of said housing to direct clarified liquid upwardly into said weir and to separate out and collect and direct higher specific gravity contaminating material downwardly into said lower end chamber portion.

* * * * *